(12) United States Patent
Neal (10) Patent No.: US 7,826,680 B2
(45) Date of Patent: Nov. 2, 2010

(54) INTEGRATED HISTOGRAM AUTO ADAPTIVE CONTRAST CONTROL (ACC)

(75) Inventor: Greg Neal, Morgan Hill, CA (US)

(73) Assignee: Genesis Microchip Inc., Santa Clara, CA (US)

( * ) Notice: Subject to any disclaimer, the term of this patent is extended or adjusted under 35 U.S.C. 154(b) by 1056 days.

(21) Appl. No.: 11/525,276

(22) Filed: Sep. 21, 2006

(65) Prior Publication Data

US 2007/0297689 A1 Dec. 27, 2007

Related U.S. Application Data

(60) Provisional application No. 60/816,845, filed on Jun. 26, 2006.

(51) Int. Cl.
*G06K 9/40* (2006.01)
(52) U.S. Cl. .................................. 382/274
(58) Field of Classification Search .......... 382/274
See application file for complete search history.

(56) References Cited

U.S. PATENT DOCUMENTS

| | | | |
|---|---|---|---|
| 5,546,474 A | 8/1996 | Zuniga | |
| 5,742,704 A | 4/1998 | Suzuki et al. | |
| 5,847,773 A | 12/1998 | Lagoni et al. | |
| 6,393,148 B1 * | 5/2002 | Bhaskar | 382/169 |
| 7,469,160 B2 * | 12/2008 | Banks et al. | 600/476 |
| 2004/0161152 A1 | 8/2004 | Marconi et al. | |
| 2005/0002566 A1 | 1/2005 | Di Federico et al. | |
| 2005/0163372 A1 | 7/2005 | Kida et al. | |
| 2005/0190980 A1 * | 9/2005 | Bright | 382/240 |
| 2006/0239581 A1 * | 10/2006 | Neuman | 382/274 |
| 2007/0071334 A1 * | 3/2007 | Sakaue | 382/239 |

FOREIGN PATENT DOCUMENTS

| | | |
|---|---|---|
| EP | 0 613 294 | 8/1994 |
| EP | 0957631 | 11/1999 |
| EP | 1 333 665 | 8/2003 |
| EP | 1 560 417 | 8/2005 |

(Continued)

OTHER PUBLICATIONS

European Search Report dated Sep. 25, 2007 in EP Application No. 07252589.2.

(Continued)

*Primary Examiner*—Charles Kim
*Assistant Examiner*—Nirav G Patel
(74) *Attorney, Agent, or Firm*—Beyer Law Group LLP; Lisa K. Jorgenson (57) ABSTRACT

The invention provides for calculating the sum of the luminance values of all pixels in each of a number of regions making up the whole image. A histogram is then created of all the sums of luminance at the end of each frame. The histogram is then rescaled such that the luminance range is normalized. Once the histogram has been created, an appropriate transfer function is created using the integrated luminance histogram for the frame. In this way detail within significant objects in the image are enhanced since the average luminance of objects in an image are weighted more than then the luminance of individual pixels providing a more realistic transfer function.

18 Claims, 6 Drawing Sheets

FOREIGN PATENT DOCUMENTS

| | | |
|---|---|---|
| GB | 2 418 316 | 3/2006 |
| WO | 9533337 | 12/1995 |
| WO | 0063838 | 10/2000 |
| WO | 0141117 | 6/2001 |

OTHER PUBLICATIONS

European Search Report dated Jan. 14, 2008 in EP Application No. 07252590.0.

Partial Search Report dated Oct. 18, 2007 in Application No. 07252590.0.

Dimitrova et al., "On Selecting Video Content Analysis and Filtering", Proceedings of the SPIE, SPIE, vol. 3972, Jan. 26, 2000, pp. 359-368.

Goh, K. H. et al., "Automatic Video Contrast Enhancement", Consumer Electronics, 2004 IEEE International Symposium on Reading, UK, Sep. 1-3, 2004, pp. 359-364.

Search Report and Written Opinion dated Nov. 17, 2008 in Singapore Patent Application No. 0704764-0.

European Search Report dated Jan. 7, 2009 in EP Application No. 07252588.4.

European Search Report dated Jan. 7, 2009 in EP Application No. 07252587.6.

* cited by examiner

INTEGRATED HISTOGRAM AUTO ADAPTIVE CONTRAST CONTROL (ACC)

CROSS REFERENCE TO RELATED APPLICATIONS

This patent application takes priority under 35 U.S.C. 119 (e) to (i) U.S. Provisional Patent Application No. 60/816,845, filed on Jun. 26, 2006 entitled "INTEGRATED HISTOGRAM AUTO ADAPTIVE CONTRAST CONTROL (ACC)" by Neal. This application is also related to the following co-pending U.S. patent applications, which are filed concurrently with this application and each of which are herein incorporated by reference, (i) U.S. patent application Ser. No. 11/768,667, entitled "UNIVERSAL, HIGHLY CONFIGURABLE VIDEO AND GRAPHIC MEASUREMENT DEVICE" naming Neal as inventor; (ii) U.S. patent application Ser. No. 11/613,009, entitled "VIDEO CONTENT DETECTOR" naming Neal as inventor; and (iii) U.S. patent application Ser. No. 11/565,464, entitled "VIDEO WINDOW DETECTOR", naming Neal as inventor.

BACKGROUND

1. Field of the Invention

This invention generally relates to improving video and graphics quality.

2. Description of Related Art

A display device renders input data as a two-dimensional image in color or grayscale. The input data may be graphical in nature. An example of such a device is a PC display monitor. The input data may be a video signal. An example of such a device is a TV or video monitor. The input data may be a combination of graphics and embedded video. An example of such a device is a PC display monitor displaying graphics with one or applications displaying video in a window, or a PC/TV display device with two or more input ports displaying graphics or full-screen video or a combination of graphics and video, e.g. Picture-in-Picture.

A viewer typically manually controls the color and contrast of a display device. The issue with manual control is that it does not result in optimal display quality for all possible input data. For example, setting the contrast control to increase the contrast of a washed out image will result in over-contrasted images for a normal image. Decreasing the color saturation setting for a highly saturated image would be optimal, but if the input changes to a de-saturated image, this setting would now be sub-optimal. It is not feasible or convenient for a viewer to continuously change display settings to adapt to the nature of the input image, particularly when the input is a video sequence.

Another problem with manual control of contrast and color is that it is not sensitive to the nature of the input data. Manual contrast control applies a multiplicative factor to the input luma component. Due to the finite dynamic range of luma values, increasing the contrast of a dark image in order to be able to see the shadow details results in loss of information in the bright highlights. The multiplicative nature of this control also implies that there is no possibility of increasing the contrast of a predominantly bright image.

In order to apply image improvement effects to graphics or video images it is necessary to know the nature of the image content. In order to correctly display graphics or video material on a flat panel display, various qualities of the material have to be measured. Implementing digital electronics for each of these measurements can be wasteful.

Figure 1:
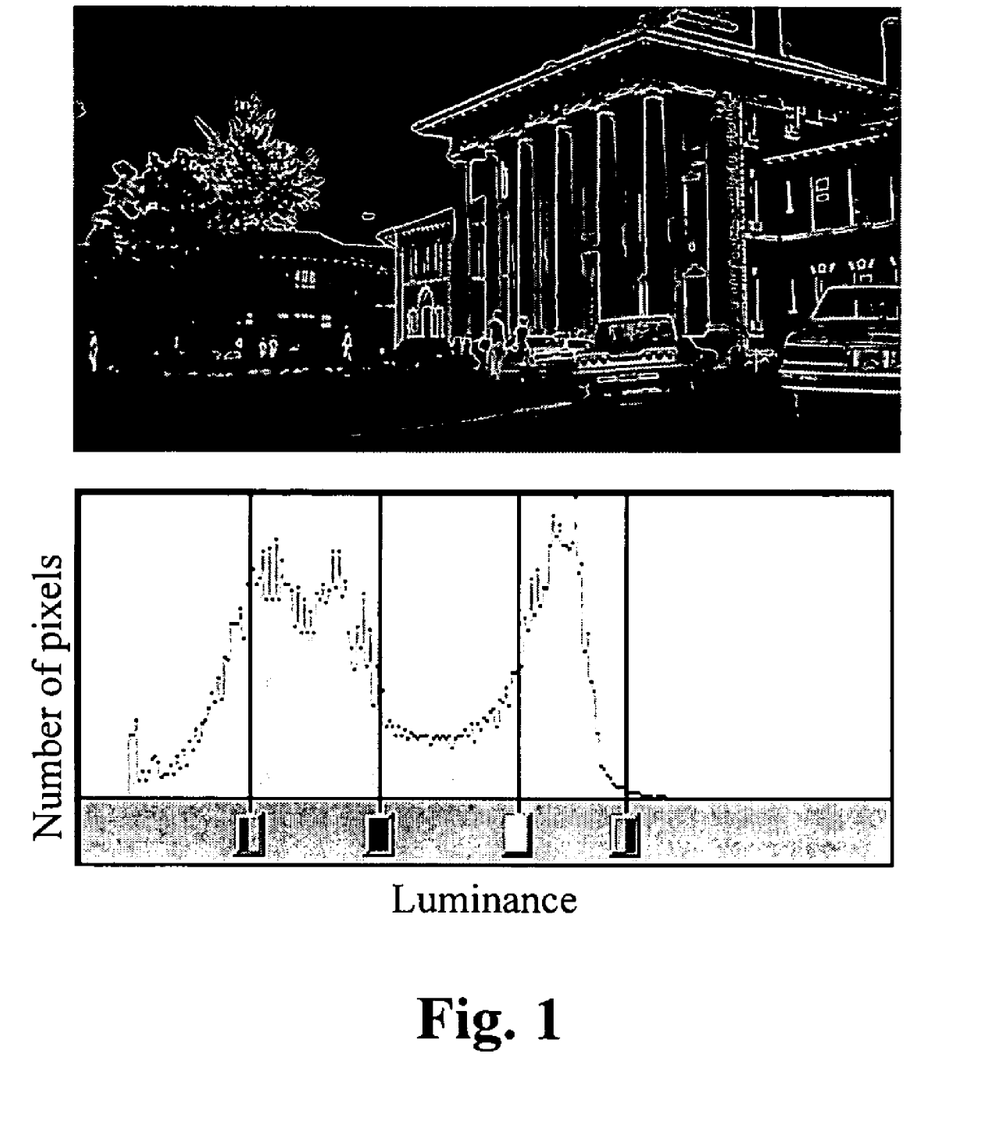
FIG. 1 shows an example medium-bright image and a histogram for the image, in accordance with an embodiment of the present invention.
Figure 2:
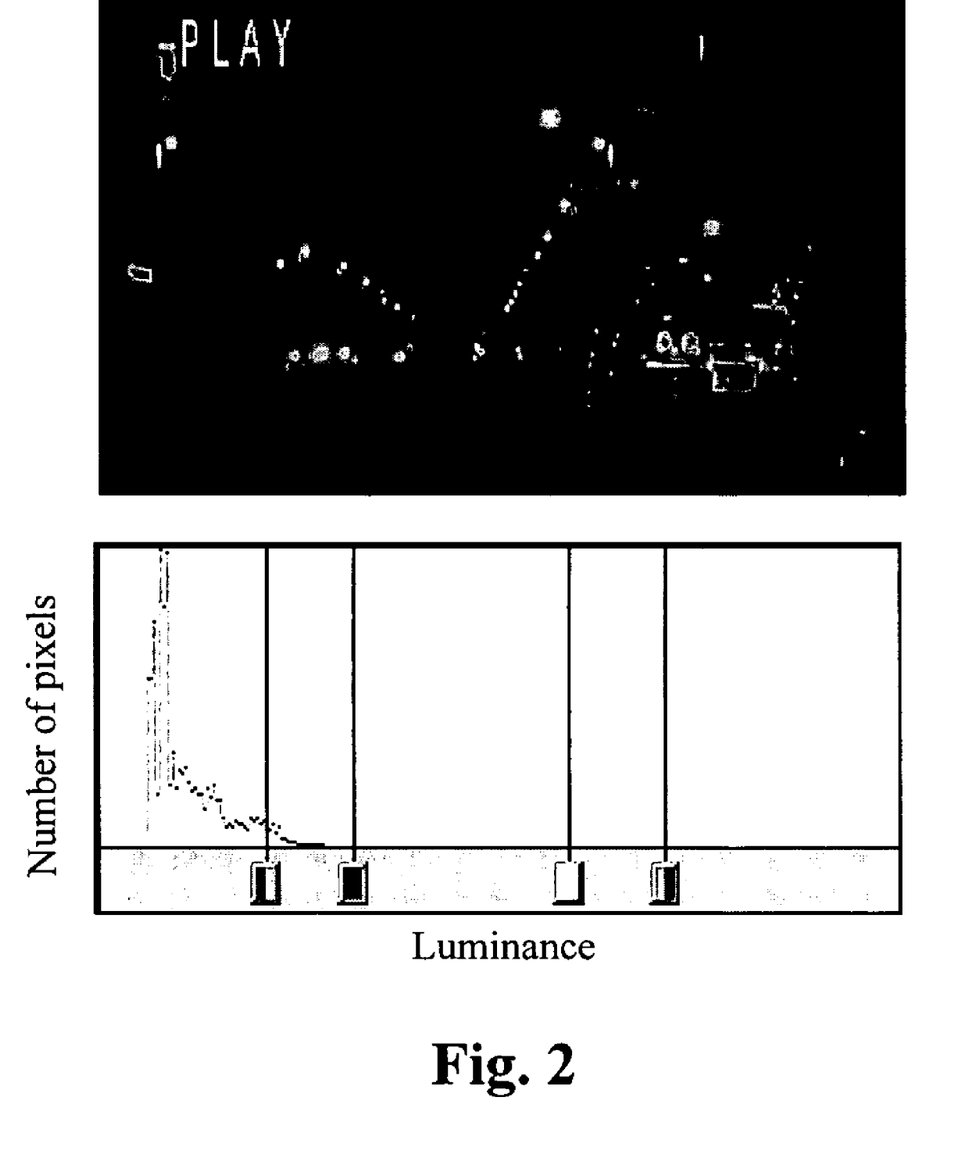
FIG. 2 shows an example dark (low-brightness) image and a histogram for the image, in accordance with an embodiment of the present invention.
Figure 3:
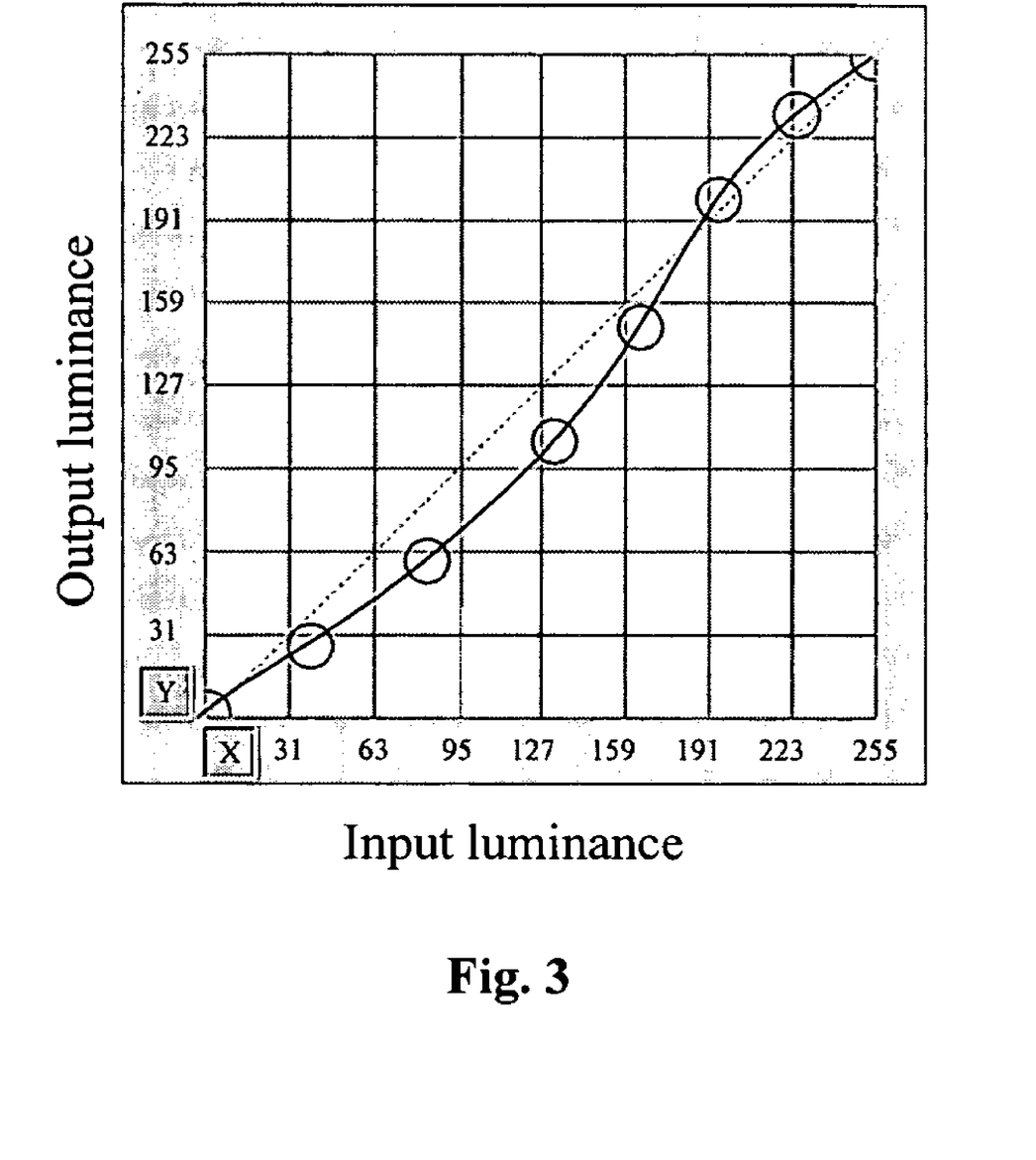
FIG. 3 shows a transfer curve for enhancing the contrast in such the image shown in FIG. 1.
Figure 4:
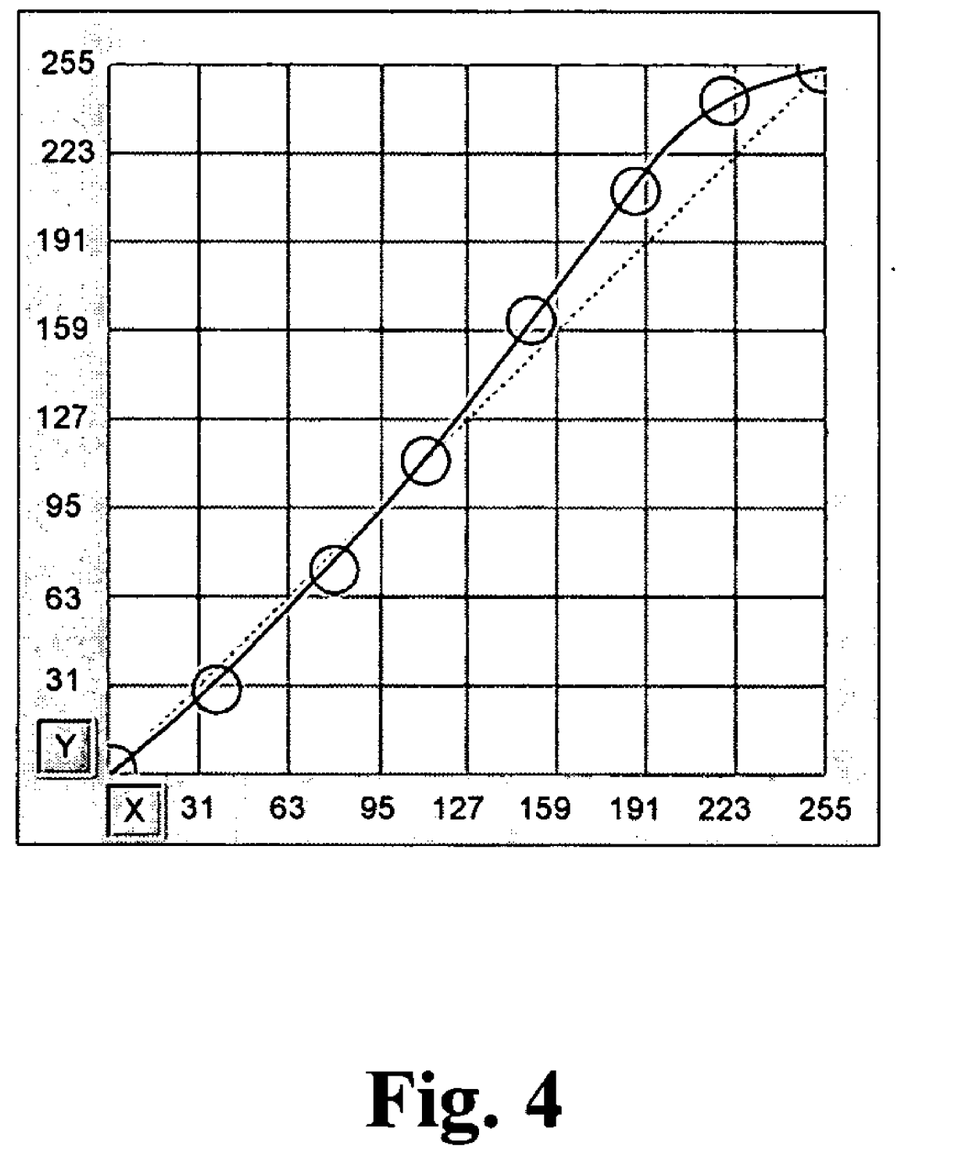
FIG. 4 shows a transfer curve for enhancing the contrast in such the image shown in FIG. 2.

For example, FIG. 1a shows representative medium-bright image and a single pixel based histogram for the image. FIG. 1b shows an example dark (low-brightness) image and a single pixel based histogram for the image. In the shown histograms, the horizontal axis represents luminance values and the vertical axis represents the number of individual pixels having a given luminance value. For example, for the dark scene in FIG. 1b, the luminance histogram indicates that most of the pixels have low luminance, while for the medium-bright scene in FIG. 1a the luminance spectrum is wider, indicating a larger number of brighter pixels. Furthermore, a histogram for a dark image is shown in FIG. 2a and a transfer curve for enhancing the contrast in such an image is shown in FIG. 2b. The histogram indicates that most of the pixels are in the low-luminance range. The transfer function increases luminance in the high-luminance regions of the image without substantially changing the luminance in the mid- and low-luminance regions of the image.

Unfortunately, however, since the transfer functions are based upon histograms that are derived from the luminance values of individual pixels, small variations in pixel luminance values (which would not in all likelihood be noticed by a viewer) can have a disproportionate impact on the transfer function and the resulting image.

Accordingly, what is needed is a system and method to address the above-identified problems. The present invention addresses such a need.

SUMMARY OF THE INVENTION

Broadly speaking, the invention relates to increasing the contrast for luminance levels that occur in significant areas of the image. The invention can be implemented in numerous ways, including as a method, system, device, apparatus, or computer readable medium. Several embodiments of the invention are discussed below.

In one embodiment, a method of adaptive contrast control includes the following operations, receiving video frame formed of a plurality of pixels each having associated pixel data, generating an integrated luminance histogram for the received video frame data, generating a transfer function in accordance with the integrated luminance histogram, and updating the video frame data using the transfer function.

In another embodiment, computer program product executable by a computer processor for adaptive contrast control includes computer code for receiving video frame formed of a plurality of pixels each having associated pixel data, computer code for generating an integrated luminance histogram for the received video frame data, computer code for generating a transfer function in accordance with the integrated luminance histogram, computer code for updating the video frame data using the transfer function, and computer readable medium for storing the computer code.

In still another embodiment, An apparatus for providing adaptive contrast control is described that includes an interface arranged to receive a video frame formed of a plurality of pixels each having associated pixel data, a histogram generator for generating an integrated luminance histogram for the received video frame data, a transfer function generator for generating a transfer function in accordance with the integrated luminance histogram, and a means for updating the video frame data using the transfer function.

Other aspects and advantages of the invention will become apparent from the following detailed description taken in conjunction with the accompanying drawings.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

The purpose of the invention is to utilize the somewhat limited luminance range of the LCD to render the source images in the best possible way. The intent is to maximize the amount of visible detail and increase the vividness of the image with minimal addition of artifacts. The invention provides for increasing the contrast for luminance levels that occur in significant areas of the image.

When preparing an image for presentation, for example on a display such as a Liquid Crystal Display (LCD), an Organic Light Emitting Diode (OLED) screen, a Digital Light Processor (DLP), a Cathode Ray Tube (CRT), a plasma panel or other type of display, it is desirable to enhance the contrast of the image by adjusting pixel luminance levels. A transfer curve can be used for describing a mapping between input luminance levels and output luminance levels. Since different images have different luminance histograms, it is desirable to tailor the transfer curve to the particular image at hand in order to obtain optimal contrast enhancement.

The invention provides for calculating the sum of the luminance values of all pixels in each of a number of regions making up the whole image. A histogram is then created of all the sums of luminance at the end of each frame. The histogram is then rescaled such that the luminance range is normalized. For example, the luminance range can be from 16 to 235 for a total of 220 luminance bins where an average value of the bins is 256. Once the histogram has been created, an appropriate transfer function is created using the integrated luminance histogram for the frame. In this way detail within significant objects in the image are enhanced since the average luminance of objects in an image are weighted more than then the luminance of individual pixels providing a more realistic transfer function.

Figure 5:
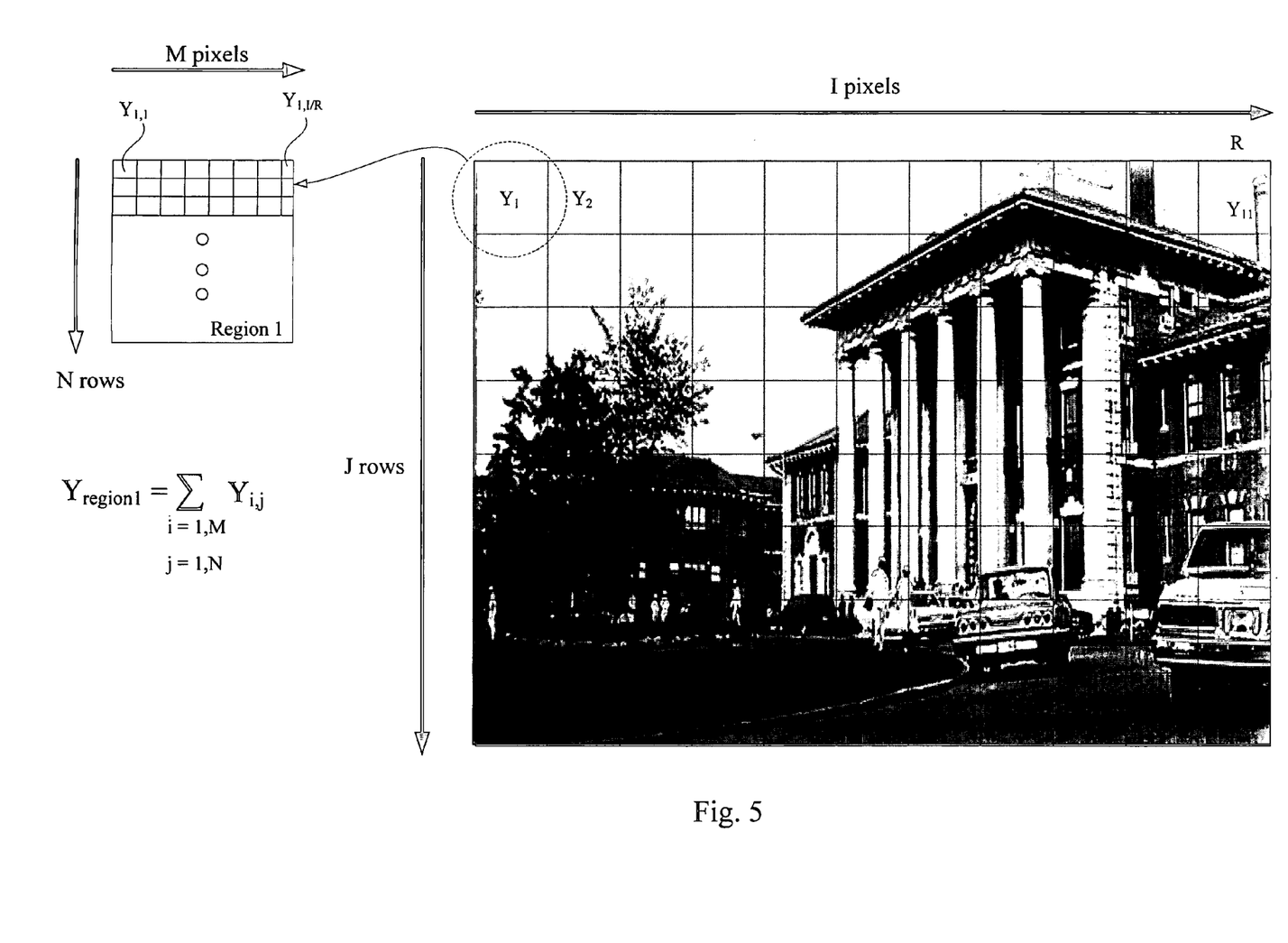
FIG. 5 graphically illustrate an implementation of the invention.

In a particular implementation as shown in FIG. 5, a video frame $F_s$ is divided into regions $R_i$ of M pixels by N pixels for a total of P pixels (i.e., P=M×N) each having a particular luminance value $Y_{i,j}$ calculated as G(reen)/2 plus R(ed)/4 plus B(lue)/8 (being an approximation to the Y portion of the RGB to YUV conversion) as shown in eq. 1

$$Y_{i,j}=(0.257*R_{i,j})+(0.504*G_{i,j})+(0.098*B_{i,j}) \qquad \text{(eq. 1)}$$

Once the luminance value for each pixel in a region Ri is calculated, an average value of all the luminance values of all the pixels in the region Ri is then calculated using equation (2):

$$Y_{reg} = \sum_{i,j=1}^{M,N} Y_{i,j}/(M \times N) \qquad \text{(eq. 2)}$$

Figure 6:
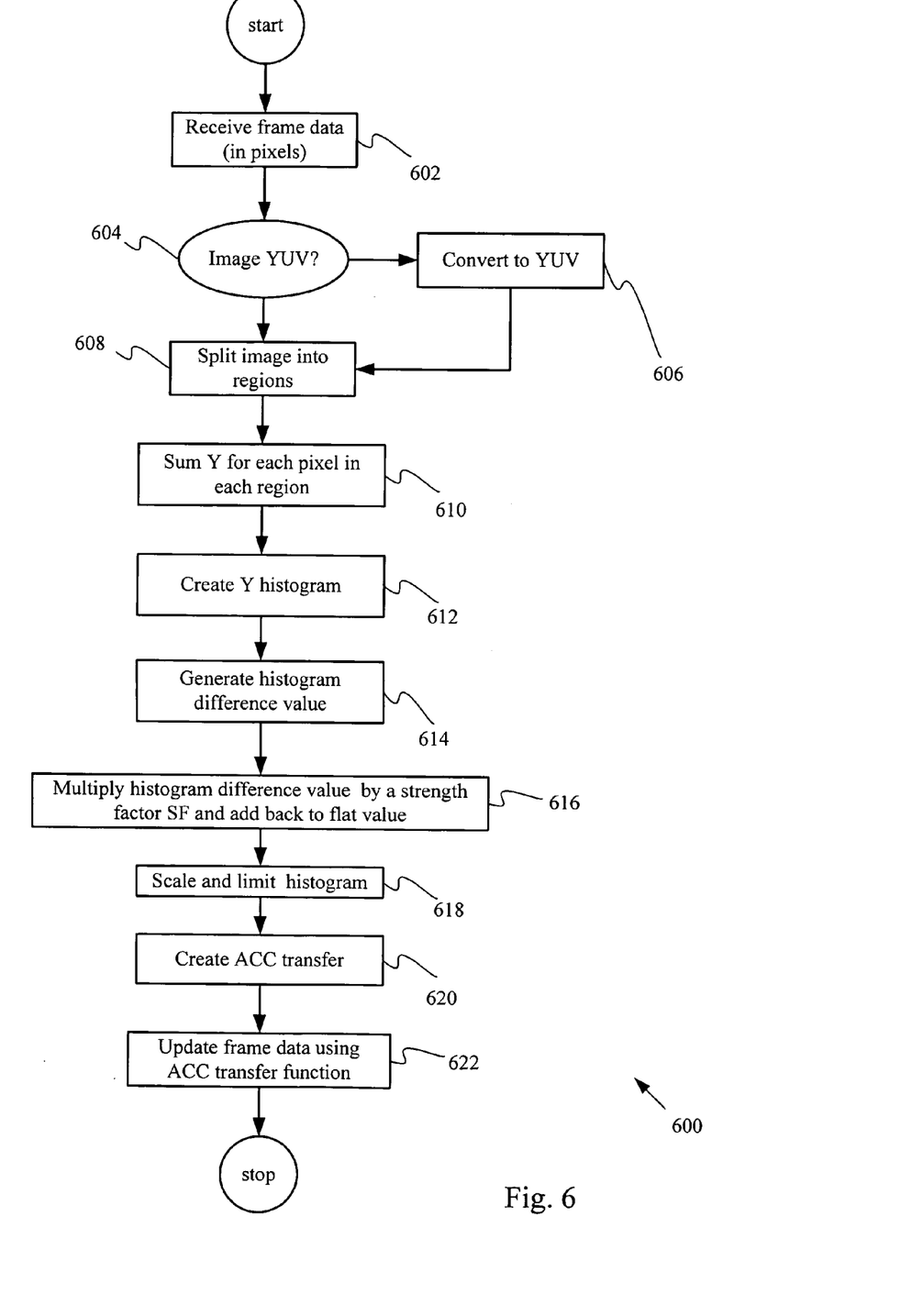
FIG. 6 shows a flowchart detailing a process for generating a transfer function based upon an integrated luminance histogram in accordance with an embodiment of the invention.

An integrated luminance histogram $H_{int}$ for the video frame $F_s$ is then generated using the integrated luminance values $Y_{reg}$ from which a transfer function $T_s$ is provided and applied on a frame by frame basis according to the process 600 described below.

FIG. 6 shows a flowchart detailing a process 600 in accordance with an embodiment of the invention. The process 600 begins at 602 by receiving a video frame in the form of pixel data. If, at 604, the pixel data is not YUV format, that the pixel data is converted to YUV format at 606. In any case, at 608, the video frame is split into a number of regions while at 610, a luminance value for each region is calculated based upon a summation of all pixel luminance values for each of the regions. At 612, a luminance histogram is generated that includes all regions. Next, at 614 a histogram difference value is generated by taking a difference between a particular histogram value and a flat histogram value of one ("1"). At 616, the histogram difference value is then multiplied by a strength factor $S_F$ which is then added back to the flat value. In this way, the histogram is conditioned such that a strength value of zero ("0") results in a flat line whereas a strength value of one ("1") results in the original histogram. At 618, the conditioned histogram values are then limited (thereby limiting the maximum slope at any point in the final transfer function) such that any histogram values above the limit are added back into the histogram by sharing them evenly. At 620, a transfer function is created by integrating the conditioned histogram by starting the transfer function at a value of 0 and then for each subsequent position, add in the corresponding value from the histogram such that a flat line histogram would give a straight line transfer function (where output values would equal input values). The transfer function is then applied at 622.

It should be noted that in the described embodiment, the transfer function is updated every frame such that if sufficient memory is available (such as a frame buffer) the updated transfer function can be applied to the frame from which the transfer function was generated. Otherwise, if sufficient memory is not available, then the updated transfer function can be applied an appropriate number of frames subsequent to the frame from which it was generated (such as one or two frames later).

Embodiments of the invention, including the apparatus disclosed herein, can be implemented in digital electronic circuitry, or in computer hardware, firmware, software, or in combinations of them. Apparatus embodiments of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. Embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other embodiments are within the scope of the following claims.

What is claimed is:

1. A method of adaptive contrast control, comprising:
   (a) receiving a video frame formed of a plurality of pixels each having associated pixel data;
   (b) generating an integrated luminance histogram for the received video frame data;
   (c) generating histogram difference values in accordance with histogram values from the integrated histogram and histogram values from a flat histogram;
   (d) multiplying the histogram difference values by a strength factor SF and adding resulting values to the histogram values of the flat histogram to generate conditioned histogram values;
   (e) scaling and limiting the conditioned histogram values resulting from step (d);
   (f) generating a transfer function in accordance with values resulting from step (e);
   (g) updating the video frame data using the transfer function to enhance contrast of the video frame;
   (h) providing the updated video frame to a display; and
   (i) when a next video frame is received, repeating steps (a) through (f) for the next received video frame.

2. A method as recited in claim 1, wherein generating the integrated luminance histogram, comprises;
   splitting the video frame into a number of regions;
   generating a luminance value for each of the pixels for each region;
   summing the luminance values for the pixels in each region;
   dividing the summed luminance value for each region by the number of pixels in each region to generate the region luminance value; and
   generating the integrated luminance histogram using the region luminance values for the video frame.

3. A method as recited in claim 2, wherein the generating the pixel luminance value $Y_{i,j}$ for each pixel $P_{ij}$ in the region is accomplished according to $Y_{i,j}=(0.257 * R_{i,j})+(0.504 * G_{i,j})+(0.098 * B_{i,j})$ where $R_{i,j}, G_{i,j}, B_{i,j}$, are RGB color components for a pixel Pij.

4. A method as recited in claim 1, further comprising: scaling the integrated luminance histogram.

5. A method as recited in claim 1, further comprising displaying the updated video frame on a display.

6. A method as recited in claim 5, wherein the display is selected from the group that includes an LCD screen, an OLED screen, a DLP screen, a CRT and a plasma panel.

7. Computer program product comprising a non-transitory computer readable storage medium having computer program code instructions stored therein executable by a computer processor for adaptive contrast control, comprising:
   computer code for receiving a video frame formed of a plurality of pixels each having associated pixel data;
   computer code for generating an integrated luminance histogram for the received video frame data;
   computer code for generating histogram difference values in accordance with histogram values from the integrated histogram and histogram values from a flat histogram;
   computer code for multiplying the histogram difference values by a strength factor SF and adding resulting values to the histogram values of the flat histogram to generate conditioned histogram values;
   computer code for scaling and limiting the conditioned histogram values;
   computer code for generating a transfer function in accordance with values resulting from the scaling and limiting; and
   computer code for updating the video frame data using the transfer function.

8. Computer program product as recited in claim 7, wherein generating the integrated luminance histogram, comprises;
   computer code for splitting the video frame into a number of regions;
   computer code for generating a luminance value for each of the pixels for each region;
   computer code for summing the luminance values for the pixels in each region;
   computer code for dividing the summed luminance value for each region by the number of pixels in each region to generate the region luminance value; and
   computer code for generating the integrated luminance histogram using the region luminance values for the video frame.

9. Computer program product as recited in claim 8, wherein the computer code for generating a luminance value for each of the pixels for each region includes:
   computer code for providing a pixel luminance value $Y_{i,j}$ for a pixel $P_{ij}$ according to $Y_{i,j}=(0.257 * R_{i,j})+(0.504 * G_{i,j})+(0.098 * B_{i,j})$ where $R_{i,j}, G_{i,j}, B_{i,j}$, are RGB color components for a pixel Pij.

10. Computer program product as recited in claim 7, further comprising:
    computer code for scaling the integrated luminance histogram.

11. Computer program product as recited in claim 7, further comprising computer code for displaying the updated video frame on a display.

12. Computer program product as recited in claim 11, wherein the display is selected from the group that includes an LCD screen, an OLED screen, a DLP screen, a CRT and a plasma panel.

13. An apparatus for providing adaptive contrast control, comprising:
  an interface arranged to receive a video frame formed of a plurality of pixels each having associated pixel data;
  a histogram generator for generating an integrated luminance histogram for the received video frame data;
  a histogram conditioner for generating scaled and limited histogram values--wherein the scaled and limited histogram values are generated by:
  generating histogram difference values in accordance with histogram values from the integrated histogram and histogram values from a flat histogram;
  multiplying the histogram difference values by a strength factor SF and adding resulting values to the histogram values of the flat histogram to generate conditioned histogram values;
  scaling and limiting the conditioned histogram values;
  a transfer function generator for generating a transfer function in accordance with the scaled and limited histogram values; and
  a means for updating the video frame data using the transfer function.

14. An apparatus as recited in claim 13, wherein generating the integrated luminance histogram, comprises:
  means for splitting the video frame into a number of regions;
  means for generating a luminance value for each of the pixels for each region;
  means for summing the luminance values for the pixels in each region;
  means for dividing the summed luminance value for each region by the number of pixels in each region to generate the region luminance value; and
  means for generating the integrated luminance histogram using the region luminance values for the video frame.

15. An apparatus as recited in claim 14, wherein the means for generating the luminance value for each of the pixels for each region includes:
  means for providing a pixel luminance value $Y_{i,j}$ for a pixel $P_{ij}$ according to $Y_{i,j}=(0.257 * R_{i,j})+(0.504 * G_{i,j})+(0.098 * B_{i,j})$ where $R_{i,j}$, $G_{i,j}$, $B_{i,j}$, are RGB color components for a pixel Pij.

16. An apparatus as recited in claim 13, further comprising: means for scaling the integrated luminance histogram.

17. An apparatus as recited in claim 13, further comprising: means for displaying the updated video frame on a display.

18. An apparatus as recited in claim 17, wherein the display is selected from the group that includes an LCD screen, an OLED screen, a DLP screen, a CRT and a plasma panel.

* * * * *